(12) United States Patent
Barford

(10) Patent No.: US 6,735,539 B2
(45) Date of Patent: May 11, 2004

(54) FOURIER TRANSFORM FOR TIMESTAMPED NETWORK DATA

(75) Inventor: Lee A Barford, San Jose, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 50 days.

(21) Appl. No.: 10/001,058

(22) Filed: Oct. 31, 2001

(65) Prior Publication Data

US 2003/0093234 A1 May 15, 2003

(51) Int. Cl.[7] .................................................. H04J 1/16
(52) U.S. Cl. .......................................... 702/76; 455/405
(58) Field of Search ............................. 702/76, 77, 79, 702/80, 81, 84, 182, 185, 186; 455/405, 423, 9; 340/3.1

(56) References Cited

U.S. PATENT DOCUMENTS

| | | | | | |
|---|---|---|---|---|---|
| 3,816,729 A | * | 6/1974 | Works | ......................... | 708/404 |
| 3,851,162 A | * | 11/1974 | Munoz | ......................... | 708/821 |
| 4,092,723 A | * | 5/1978 | Picquendar et al. | ......... | 708/405 |
| 4,563,750 A | * | 1/1986 | Clarke | ......................... | 708/404 |
| 6,563,796 B1 | * | 5/2003 | Saito | ........................... | 370/252 |

* cited by examiner

*Primary Examiner*—Marc S. Hoff
*Assistant Examiner*—Edward Raymond
(74) *Attorney, Agent, or Firm*—Robert T. Martin

(57) ABSTRACT

Spectrum estimates of unevenly spaced timestamped data collected over a network. Unevenly spaced data is not suitable for processing by traditional methods such as Fast Fourier Transforms. Spectrum estimates of timestamped data collected over a network are calculated using a Continuous Fourier Transform. If the time between samples is long, spectrum estimates may be computed incrementally.

6 Claims, 3 Drawing Sheets

FOURIER TRANSFORM FOR TIMESTAMPED NETWORK DATA

FIELD OF THE INVENTION

The present invention pertains to dealing with measurements taken at unevenly-spaced intervals in a computer network, and deriving a frequency spectrum from these measurements.

ART BACKGROUND

Many companies, such as Agilent Technologies, Hewlett-Packard, and others, support sensor nodes based on IEEE 1451 standards. Such standards allow the deployment of sensors on networks ranging from dedicated Ethernet local area networks to corporate internets to the World Wide Internet.

Current TCP/IP networks currently offer no quality-of-service guarantees. This causes a problem for many measurement applications, such as difficulty taking measurements at accurate and pre-determined time intervals.

U.S. Pat. No. 5,566,180 to Eidson et. al. teaches a method and apparatus for providing precise control of timing in distributed nodes in a network. U.S. Pat. No. 6,278,710 to Eidson provides further enhancement to time synchronization protocols for a distributed system.

These protocols provide the ability to accurately timestamp measurements taken by nodes on a network. Nevertheless, the times that measurements are taken may not be evenly spaced.

Many applications require the processing of data comprising sequences of such timestamped measurements. But many commonly used applications, such as signal processing algorithms, operate on data collected at evenly spaced times. One such common signal processing task is providing spectral data through the calculation of a Fourier Transform. What is needed is a method of calculating Fourier Transforms on unevenly spaced timestamped network data.

SUMMARY OF THE INVENTION

Spectrum estimates of unevenly spaced timestamped network data are calculated using estimates of a Continuous Fourier Transform. If the time between samples is long, the estimates may be computed incrementally.

BRIEF DESCRIPTION OF THE DRAWINGS

The present invention is described with respect to particular exemplary embodiments thereof and reference is made to the drawings in which.

DETAILED DESCRIPTION

Figure 1:
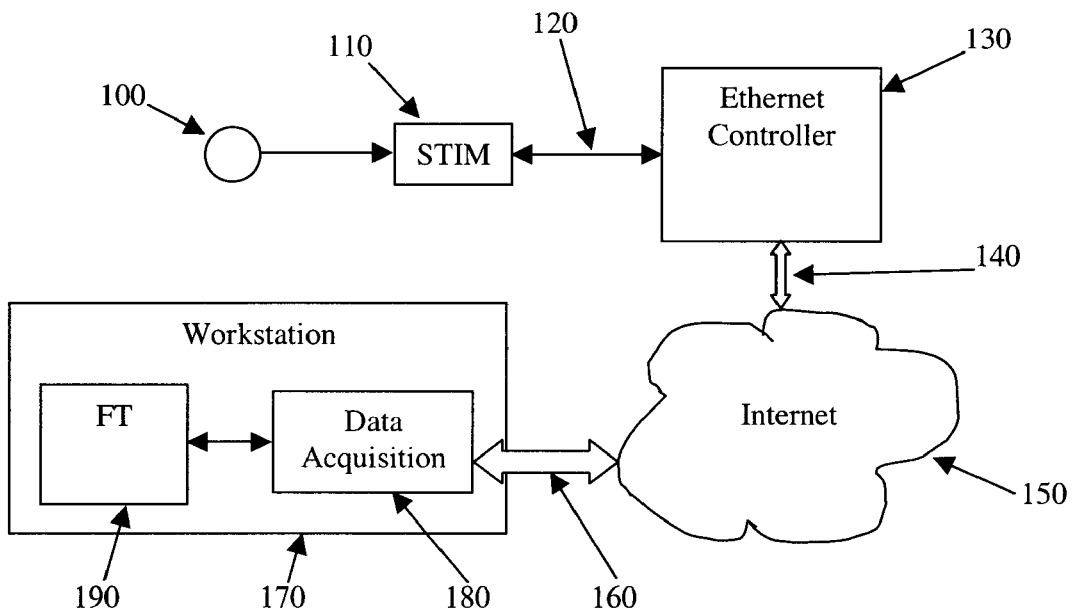
FIG. 1 shows a block diagram of network data collection.

FIG. 1 shows a block diagram of network data collection. Signal source 100 provides a signal to smart transducer interface module (STIM) 110. STIM 110 communicates 120 with Ethernet Controller 130. Ethernet Controller 130 communicates 140 to the Internet 150. Workstation 170 also communicates 160 with the Internet 150. In a data collection application such as that contemplated by the present invention, Data Acquisition software module 180 collects data from source 100 through STIM 110 through the communications paths shown. Fourier Transform software module 190 uses the data collected by Data Acquisition module 180 and calculates a frequency spectrum of the data. In the preferred embodiment, Data Acquisition module 180 is written in Java to maintain portability. Fourier Transform module 190 is written in Matlab. These two modules may be implemented in many different computer languages, and may be combined.

The Internet is a wild beast. When protocols such as TCP/IP are used, packet delivery time is not guaranteed. The routing and therefore transit times of individual packets between end nodes such as Ethernet Controller 130 and workstation 170 may vary on a packet-to-packet basis. To this may be added delays interposed by proxy servers, routers, switches, other Internet traffic, and the like.

In the example of FIG. 1, Signal Source 100 is an Agilent Technologies 33120A Function Generator producing an amplitude modulated signal with a center frequency of 0.01 Hz modulated at 0.01 Hz. This produces a signal with strong peaks at 0.01 Hz and 0.02 Hz.

Workstation 170 has a Java-written data acquisition program 180 acquiring 1000 data samples of Signal Source 100 through STIM 110 and Ethernet Controller 130. Data acquisition program 180 makes a separate HTTP connection for each data sample. One connection with multiple data requests could also be performed. Each data sample includes an accurate time stamp as well as the value of Signal Source 100.

Figure 2:
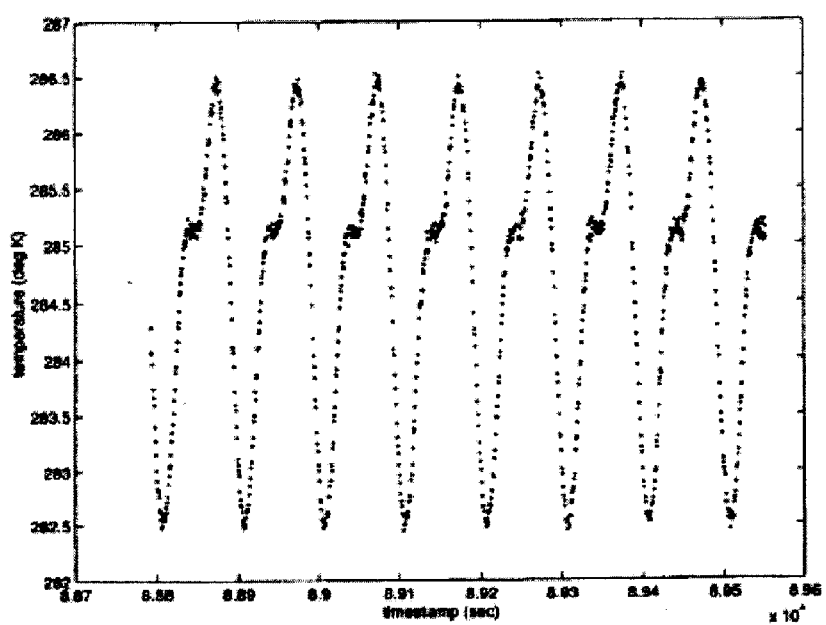
FIG. 2 is a graph of data collected over a network.
Figure 3:
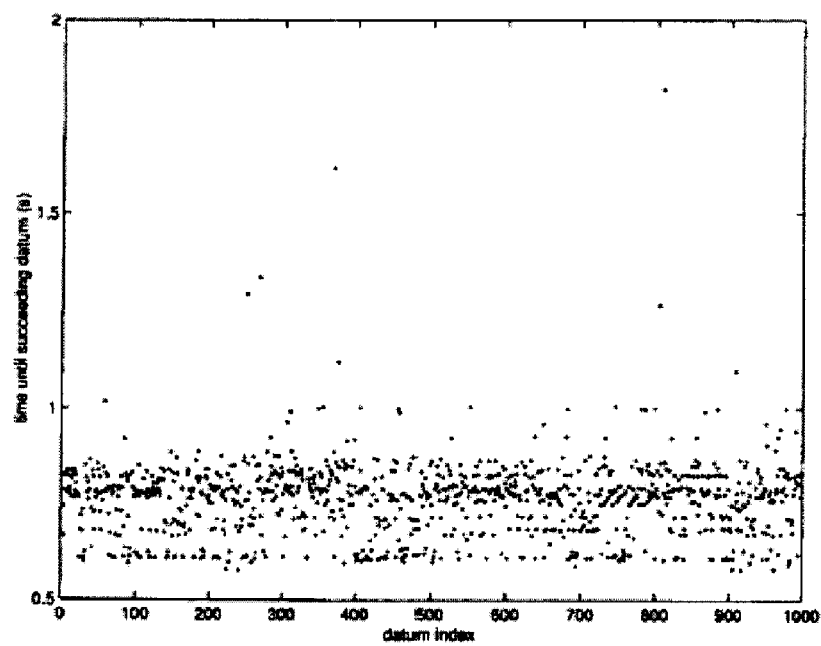
FIG. 3 is a graph of time between data samples collected over a network.

FIG. 2 is a graph of the collected data. Note that the distribution of points in the horizontal, or time axis, is not uniform. The inter-measurement delay is better seen in FIG. 3, showing an almost four-to-one variation in sample acquisition times.

The variability in sample acquisition time makes calculating spectral data using traditional approaches difficult.

The common approach to deriving spectral data from a series of measurements is to calculate a Discrete Fourier Transform or a Fast Fourier Transform. These are derived from the Continuous Fourier Transform.

The Fourier Transform $F(\omega)$ of a real or complex function $x(t)$ is $$F(\omega) = \frac{1}{\sqrt{2\pi}} \int_{-\infty}^{\infty} e^{2\pi j \omega t} x(t) \, dt \qquad (1)$$

For any real frequency $\omega$ and where $j=\sqrt{-1}$. For the present invention, we will deal with t measured in seconds and $\omega$ to be frequency measured in Hertz. In most signal processing applications, the signal is sampled at a constant time interval $\Delta t$ yielding N samples $x(0), x(\Delta t), \ldots, x((N-1)\Delta t)$. The Discrete Fourier Transform (DFT) arises as the discrete (summation) form of Equation (1) above:

$$F(\omega_i) = \frac{1}{N} \sum_{k=0}^{N-1} e^{2\pi j \omega_i k \Delta t} x(k \Delta t) \qquad (2)$$

Computing the sums in Equation (2) in the straightforward way requires $O(N^2)$ computations. The Fast Fourier Transform (FFT) is a means for calculating these sums in $O(N \log N)$ computations. Unfortunately, the correctness of the derivations of both the DFT and FFT depend on the sampling rate $\Delta t$ being constant. Thus the Discrete and Fast Fourier Transforms are not suited to handling unevenly sampled timestamped data.

In the present invention, let $$t_0, t_1, \ldots t_{N-1} \quad (3)$$

be the times the signal was sampled, and let $$x_0, x_1, \ldots x_{N-1} \quad (4)$$

be the measured values of the signal $x(t)$ at those times, i.e. $x_i = x(t_i)$.

It is also useful to assume that the time stamps are precise, having many significant digits provided, and accurate. This condition is met if the accuracy of the clock being used to timestamp ticks in fine time quanta is small in comparison to the time constants of the physical system being measured. When this condition is met, time may be considered to be continuous.

In order to evaluate Equation (1), it is assumed that the signal $x(t)$ is identically zero before and after the time during which it is measured. Other reasonable assumptions on the signal $x(t)$ in between the times it is measured include:

Zero Order Hold (ZOH) The signal maintains a constant value up until the time of the next sample. That is, if $t_i \leq t < t_{i+1}$, then $x(t) = x(t_i)$. The Zero Order Hold assumption is reasonable if the signal is oversampled.

First Order Hold (FOH) The signal is continuous and piecewise linear, with first derivative discontinuities at the sampling times. That is, if $t_i \leq t < t_{i+1}$, then $$x(t) = \lambda x(t_i) + (1-\lambda) x(t_{i+1}) \text{ where } \lambda = (t-t_i)/(t_{i+1}-t_i).$$

Locally Polynomial The signal is locally given by a quadratic, cubic, or other polynomial function that interpolates or fits several adjacent samples.

Bandlimited The signal's spectrum must have no power outside of a particular frequency band.

One approach to dealing with unevenly sampled timestamped data is to resample the data evenly, interpolating between the data in order to yield evenly spaced samples, and then perform an FFT on the resampled data. In resampling, any of the assumptions (zero order hold, first order hold, polynomial, etc.) can be used to determine resampled values at the desired evenly spaced time points.

The Fast Fourier Transform (FFT) works most efficiently if its input has a length which is an integer power of two. Choose an integer $k > \log_2 N$ (for example, $k = \lceil \log_2 N \rceil$) and let $N' = 2^k$ be the number of points to be in the re-sampled data. The times of the re-sampled data will then be $t'_0, \ldots, t'_{N-1}$, where $$t'_i = \frac{i}{N-1}(t_{N-1} - t_0) + t_0.$$

Resampling is performed according to the assumptions made on the nature of the data. In the simplest case, assuming zero-order-hold, the resampled datum $x'_i$ at time $t'_i$ is $x'_i = x_j$ where $j$ is the largest integer such that $t_j \leq t'_i$. If first-order-hold is assumed, then the resampled datum $x'_i$ at time $t'_i$ is a linear interpolation of the two closest points $x'_i = \lambda x_j + (1-\lambda) x_{j+1}$, where again $j$ is the largest integer such that $$t_j \leq t'_i \text{ and } \lambda = \frac{t_{j+1} - t'_i}{t_{j+1} - t_j}.$$

Higher order scaling functions may also be applied, such as quadratic, cubic, or other polynomial methods.

According to the present invention, assuming zero-order-hold on the sampled signal, the Fourier Transform $F(\omega)$ of Equation (1) becomes $$F(w) = \frac{1}{\sqrt{2\pi}} \sum_{i=0}^{N-1} \int_{t_i}^{t_{i+1}} e^{2\pi j \omega t} x(t) \, dt \quad (5)$$

$$= \frac{1}{\sqrt{2\pi}} \sum_{i=0}^{N-1} \int_{t_i}^{t_{i+1}} e^{2\pi j \omega t} x(t_i) \, dt \quad (6)$$

$$= \frac{1}{(2\pi)^{3/2} \omega j} \sum_{i=0}^{N-1} (e^{2\pi j \omega t_{i+1}} - e^{2\pi j \omega t_i}) x_i \quad (7)$$

Normally, $F(\omega)$ is computed at about $N/2$ frequencies, requiring on the order of $O(N^2)$ computations to calculate Equation (7). For moderate values of $N$ this may be acceptable.

If the time between samples is long, the Fourier Transform may be computed incrementally. Initially set $F(\omega) \leftarrow 0$ for each frequency $\omega$ for which a spectral estimate is desired. Then after each sample $x_i$ measured at time $t_i$ is received, set $$F(\omega) \leftarrow F(\omega) + \frac{1}{(2\pi)^{3/2} \omega j} \sum_{i=0}^{N-1} (e^{2\pi j \omega t_{i+1}} - e^{2\pi j \omega t_i}) x_i \quad (8)$$

This incremental process can be used to provide an estimate of the spectrum which is updated after the arrival of each new measurement.

Equation (7) may be implemented for example as the Matlab source program shown as Computer Listing 1 at the end of this application. In this embodiment, time is rescaled to the interval $0 \leq t \leq 2\pi$. This rescaling is useful as the values for the timestamps may be numerically quite large, for example the number of seconds from an epoch date such as 1 Jan. 1970. Computing sines, cosines or exponentials of large arguments may produce inaccurate results. The Continuous Fourier Transform is calculated on scaled frequencies, and the resulting frequencies are rescaled to correspond to the original time scale.

Figure 4:
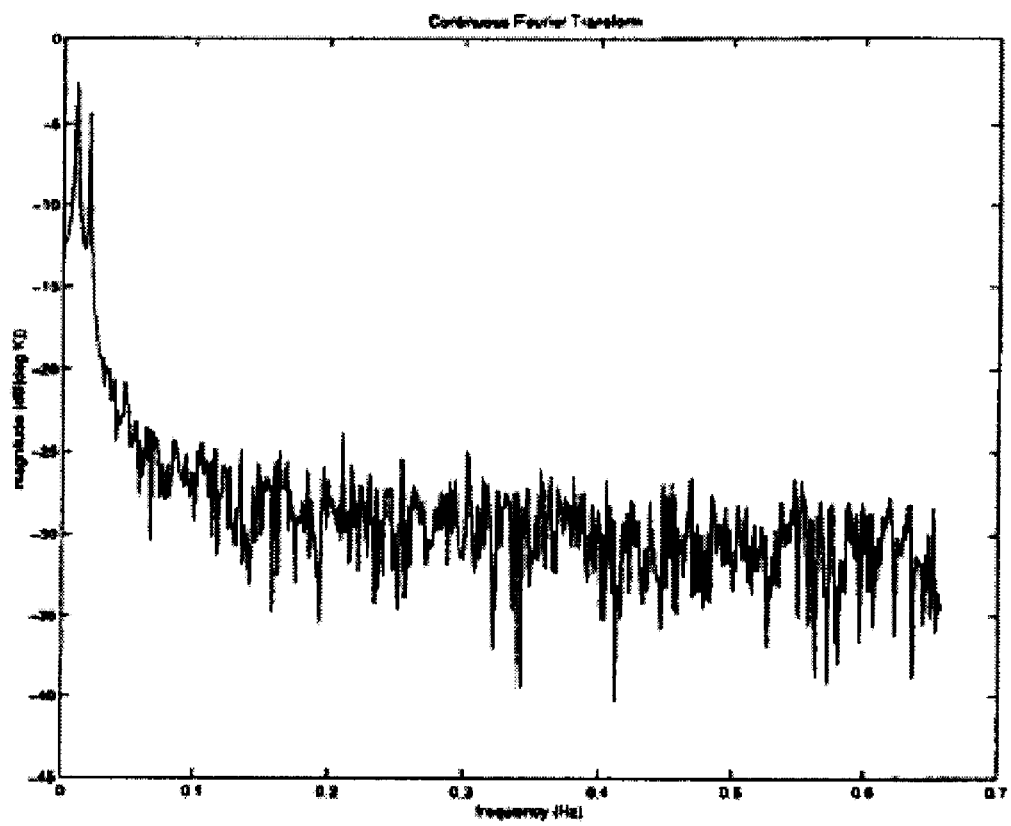
FIG. 4 is a spectrum calculated from the collected data.

Applying the program of Computer Listing 1 to the data shown in FIG. 2 produces the spectrum shown in FIG. 4. This spectrum shows strong peaks at 0.01 Hz and 0.02 Hz.

The foregoing detailed description of the present invention is provided for the purpose of illustration and is not intended to be exhaustive or to limit the invention to the precise embodiments disclosed. Accordingly the scope of the present invention is defined by the appended claims.

| Computer Listing 1 |
| --- |

```
function [freqs, y] = FT_timestamped(t, x, algorithm)
% [freqs, y] = FT_timestamped(t, x)
%
% t          Real vector: times that the data were measured.
% x          Vector: the data.
% freqs      Real vector: frequencies in Hertz.
% y          Complex vector: y(i) is the complex amplitude of the data at
%            frequency freqs(i).
% Notes:     length(t) must equal length(x).
%
if( nargin < 3)
    algorithm = 2;
end
len_t = length(t);
i = 1:len_t-1; % Indexes the whole of t & x EXCEPT for the last
element
% Check parameter validity
mbrealvector(t);
mbvector(x);
if( len_t ~= length(x) )
    error('t and x do not have the same length');
end
t=t(:);
x=x(:);
% Max freq. per Nyquist criterion
max_Hz = len_t / (2*(t(end)-t(1)))
nfreqs = ceil(len_t / 2)
freqs = [1:nfreqs-1];
if algorithm==1
    % Algorithm 1: Continuous Fourier Transform
    % Shift and scale time to lie in the interval [0, 2*pi].
        % This scaling is important: algorithms for computing
        % sines, cosines, or comlex exponentials generally become
        % inaccurate for large arguments.
        t = t - t (1);
        t_end = t(end)
        scale = 2*pi / t(end);
        t = scale * t;
        y = zeros(size(freqs)); % Preallocate space for y
        for omega = freqs
%           y(omega) = sum( (exp(j*omega*t(i))-exp(j*omega*t(i+1))).*x(i) )
...
%                                  * (j/(omega*sqrt(2*pi)));
            y(omega) = sum( (exp(j*omega*t(i))-exp(j*omega*t(i+1))).*x(i) )
./ omega;
    end
    y = y * (j/(2*pi));
    % Scale the frequencies to correct time scale
    freqs = (max_Hz / nfreqs) * freqs;
    dc = sum( x(1:end-1) .* (t(2:end)-t(1:end-1)) ) ./ (t(end)-t(1));
    freqs = [-freqs(end:-1:1) 0 freqs];
    y = [conj(y(end:-1:1)) dc y];
elseif (algorithm==2) | (algorithm==3)
    % Algorithm 2 & 3: Resampling followed by FFT
    len_newt = 2^ceil(log2(len_t)) % Smallest power of 2 that is >=
len_t
    newt = 0:len_newt-1;
    newt = newt*((t(end)-t(1))/(len_newt-1)) + t(1);
    new_max_Hz = len_newt / (2*(t(end)-t(1)))
    newt1_minus_t1 = newt(1)-t(1)
    newtend_minus_tend = newt(end)-t(end)
    newx = zeros(size(newt));
    size_newx = size(newx)
    nextSampleIndex = 1;
    % ZOH resampling in O(N) time
    %t = [t ; inf];
    for i=1: length (newt)-1
        while( ~( newt(i) < t(nextSampleIndex+1) ) )
            nextSampleIndex = nextSampleIndex + 1;
        end
        switch algorithm
            case 2,
                % Zero Order Hold
                newx(i) = x(nextSampleIndex);
            case 3,
                % First Order Hold
                lambda = (t(nextSampleIndex+1)-
```

-continued

Computer Listing 1

```
newt(i))/(t(nextSampleIndex+1)-t(nextSampleIndex));
                newx(i) = lambda*x(nextSampleIndex) + (1-
lambda)*x(nextSampleIndex+1);
        end
    end
    newx(end) = x(end);
    %diffx = max(abs(newx(:)-x(:)))
    y = fftshift(fft(newx)) ./ length(newx);
    %freqs = ([-len__newt/2:len__newt/2-1]) * (new__max__Hz /
(len__newt/2));
    freqs = ([-len__newt/2:len__newt/2-1]) ./ (t(end)-t(1));
    size__y = size(y)
    size__f = size(freqs)
end
```

What is claimed is:

1. A method of calculating spectrum estimates comprising:

collecting timestamped data over a computer network, and calculating spectrum estimates using a Continuous Fourier Transform where the spectrum estimates $F(\omega)$ of data samples having values $x_i$ timestamped at time $t_i$ are calculated as $$F(\omega) = \frac{1}{(2\pi)^{3/2}\omega j} \sum_{i=0}^{N-1} (e^{2\pi j\omega_{i+1}} - e^{2\pi j\omega_i}) x_i.$$

2. A method of calculating spectrum estimates comprising:

collecting timestamped data over a computer network, and calculating spectrum estimates using a Continuous Fourier Transform where the spectrum estimates $F(\omega)$ of data samples having values $x_i$ timestamped at time $t_i$ are calculated incrementally as $$F(\omega) \leftarrow F(\omega) + \frac{1}{(2\pi)^{3/2}\omega j} \sum_{i=0}^{N-1} (e^{2\pi j\omega t_{i+1}} - e^{2\pi j\omega t_i}) x_i.$$

3. A computer system for computing spectrum estimates comprising:

means for collecting timestamped data from a device connected to a network, and means for computing a Continuous Fourier Transform on the collected timestamped network data producing spectrum estimates where the spectrum estimates $F(\omega)$ of data samples having values $x_i$ timestamped at time $t_i$ are calculated as $$F(\omega) = \frac{1}{(2\pi)^{3/2}\omega j} \sum_{i=0}^{N-1} (e^{2\pi j\omega_{i+1}} - e^{2\pi j\omega_i}) x_i.$$

4. A computer system for computing spectrum estimates comprising:

means for collecting timestamped data from a device connected to a network, and means for computing a Continuous Fourier Transform on the collected timestamped network data producing spectrum estimates where the spectrum estimates $F(\omega)$ of data samples having values $x_i$ timestamped at time $t_i$ are calculated incrementally as $$F(\omega) \leftarrow F(\omega) + \frac{1}{(2\pi)^{3/2}\omega j} \sum_{i=0}^{N-1} (e^{2\pi j\omega t_{i+1}} - e^{2\pi j\omega t_i}) x_i.$$

5. A computer readable medium carrying one or more sequences of instructions from a user of a computer system for computing spectrum estimates of timestamped network data, wherein execution of the one or more sequences of instructions by one or more processors causes the one or more processors to perform the steps of:

collecting timestamped data from a network device, and calculating a Continuous Fourier Transform on the collected timestamped data producing spectrum estimates where the spectrum estimates $F(\omega)$ of data samples having values $x_i$ timestamped at time $t_i$ are calculated as $$F(\omega) = \frac{1}{(2\pi)^{3/2}\omega j} \sum_{i=0}^{N-1} (e^{2\pi j\omega_{i+1}} - e^{2\pi j\omega_i}) x_i.$$

6. The computer readable medium of claim 5 where the spectrum estimates $F(\omega)$ of data samples having values $x_i$ timestamped at time $t_i$ are calculated incrementally as $$F(\omega) \leftarrow F(\omega) + \frac{1}{(2\pi)^{3/2}\omega j} \sum_{i=0}^{N-1} (e^{2\pi j\omega t_{i+1}} - e^{2\pi j\omega t_i}) x_i.$$

* * * * *